C. H. Poage.
Horse-Rake.

N° 82345. Patented Sept. 22, 1868

Witnesses
R. J. Campbell
Edw Schafer

Inventor
C. H. Poage
by
Mason, Fenwick & Lawrence

United States Patent Office.

C. H. POAGE, OF PERRY, MISSOURI.

Letters Patent No. 82,345, dated September 22, 1868.

IMPROVEMENT IN HORSE-RAKES.

The Schedule referred to in these Letters Patent and making part of the same.

TO ALL WHOM IT MAY CONCERN:

Be it known that I, C. H. POAGE, of Perry, in the county of Ralls, and State of Missouri, have invented a new and improved Machine for Gathering Hay; and I do hereby declare that the following is a full, clear, and exact description thereof, reference being had to the accompanying drawings, making part of this specification, in which—

Similar letters of reference indicate corresponding parts in the two figures.

The nature of my invention consists in the employment of a staple and ring as a means for connecting the flexible draught-chains, or cords, or straps to the head of a rake, which operates on the plan hereinafter described.

The advantages of my invention over the crane-attachment heretofore used in such rakes, are these:

First, the ring and staple-attachment or connection is more simple in construction, of greater durability, and there is very little chance for derangement while the rake is in operation.

Second, the attachment of the chains, or cords, or straps being thrown nearer on a horizontal plane with the point of the teeth by the use of the ring and staple, therefore the pressure on the teeth is not so great; consequently the draught is much lighter, and the liability of forcing the teeth into the earth lessened; hence my rake can be used upon ground where that style of rake with a crane would be found almost impracticable.

To enable others skilled in the art to understand my invention, I will describe its construction and operation.

In the accompanying drawings—

$a$ represents a long beam or axle, which is mounted upon two small rollers or wheels $b\ b$, and $c$ is a piece which is secured to the front side of said beam for the purpose of stiffening and strengthening it. This strengthened beam serves as a rake-head for receiving a number of teeth, $d\ d$, which project out, and have their front or gathering-ends pointed by curving their lower edges.

By thus pointing the teeth they will run freely over the ground, and gather up the scattered hay without liability of running into the ground and dragging up roots.

Near the extremities of the beam or rake-head $a$, staples $e'\ e'$ are secured on its upper edge, and to these staples, rings, $e\ e$, are applied, to which draught-chains or ropes $g\ g$ are secured. These chains have single-trees fastened to them for the attachment of the horses that draw the machine over the field.

In order to give a better understanding of the practical advantages of my invention, I will state that the beam $a$ may be made from fifteen to eighteen feet long, with teeth from seven to eight feet long, and about ten inches apart. The beam may be elevated about six inches from the ground by means of two wheels, which are sixteen inches in diameter.

With this simple machine and two horses, the grass or hay is taken directly from the swath to the place for stacking it.

Figure 1:
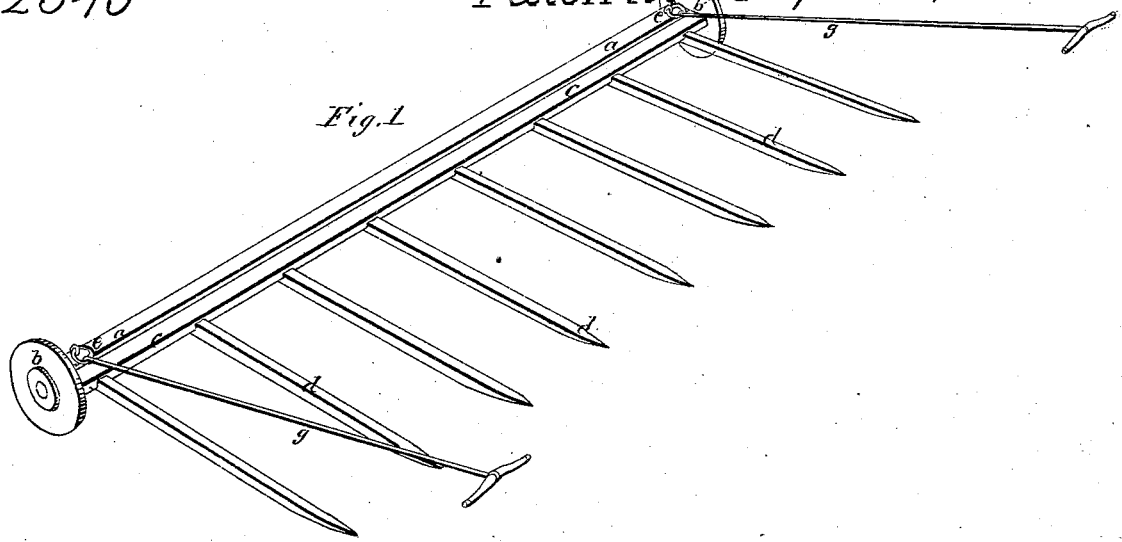
Figure 1 is a perspective view of the improved machine complete.
Figure 2:
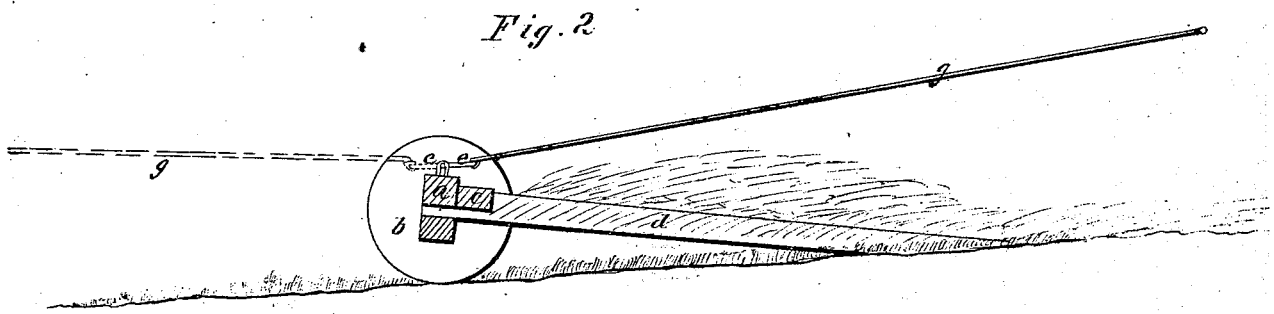
Figure 2 is a sectional elevation of the improved machine.

In unloading, the horses, which are attached to the chains $g\ g$, are turned, one to the right and the other to the left, going round the ends of the rake-head to the opposite side of the machine, as shown by the red line in fig. 2; when, by moving the horses forward, (backward with respect to the machine,) they will draw the machine from beneath the load, leaving the load upon the ground. In this condition the machine is drawn to the place for gathering another load. The horses are then turned as before, so as to bring them on the same side as the teeth.

The small wheels, $b\ b$, serve as rolling supports for the head of the gatherer, and also to elevate the rear ends of the gathering-teeth sufficiently high to pitch or incline these teeth forward, and cause them to pass under and gather up the scattered grass without allowing the grass which has been gathered to escape behind the machine.

I am aware that hay-gatherers which act as carriers are not new. I also am aware that the draught-chains of such machines have been attached to cranes, which swivel or turn entirely around. I also am aware that these chains have been attached to reversible vibrating arms; therefore I do not claim any of these things as new; but What I do claim as my invention, and desire to secure by Letters Patent, is—

The combination of the staples $e'$ and rings $e$ with the rake $a\ b\ c\ d$, and the flexible draught-chains or cords or straps $g\ g$, substantially in the manner and for the purpose described.

C. H. POAGE.

Witnesses:
    W. W. TRIMBLE,
    T. B. LUNSFORD.